Figure 1:
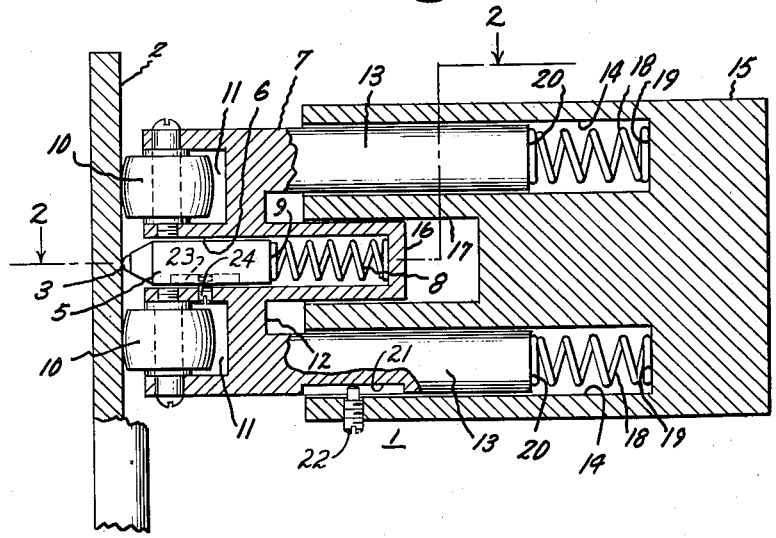

Jan. 3, 1961   E. H. HULL ET AL   2,966,722
IRREGULAR SURFACE DIAMOND BURNISHING TOOL
Filed Nov. 5, 1957

Inventors:
Edwin H. Hull,
Anthony J. Nerad,
by Paul A. Frank
Their Attorney.

United States Patent Office 2,966,722
Patented Jan. 3, 1961

2,966,722

IRREGULAR SURFACE DIAMOND BURNISHING TOOL

Edwin H. Hull, Scotia, and Anthony J. Nerad, Alplaus, N.Y., assignors to General Electric Company, a corporation of New York Filed Nov. 5, 1957, Ser. No. 694,633

2 Claims. (Cl. 29—90)

This invention relates to burnishing and more particularly, to a diamond burnishing tool for burnishing curved or otherwise irregular surfaces.

Burnished surfaces are becoming increasingly desirable for many applications, not only in precision machinery for various mating and wear resistant surfaces, but also for various applications where a pleasing or smooth surface may be desired. Burnishing increases greatly the overall durability characteristics of a surface. For example, a burnished rod required six times the number of cyclic stresses to fail as compared to a non-burnished rod. Burnishing produces a cold working of a thin surface section of a metallic or non-metallic object, thus increasing the strength of the surface by impressing compressive stresses approaching the elastic limit of the material. A burnished surface is desirable for extremely high speed objects such as missiles or interplanetary vehicles, which generally incorporate a nose cone required to be particularly smooth for reduced friction, hard enough to withstand abrasion, and strong enough to maintain its normal physical characteristics at elevated temperatures. Another example of a very desirable application of burnishing is turbo machinery buckets or blades which, relatively speaking, are subjected to the same problems as missile cones, that is, high temperatures, erosion, friction, and strength. It is readily understood that the smoother the finish the less friction which will be encountered from air or gas flow.

The smoothness of a burnished surface may approach a one micro-inch average finish, a finish which may be described as the average height of the areas projecting above or below a centerline representing a smooth surface. Machining and grinding methods usually employed result in an average finish of 4 to 60 microinches.

Where the surface to be burnished is of geometric form such as planar, cylindrical, or conical, a standard burnishing tool comprising a shank having a burnishing element affixed thereto may be readily employed. Such a tool mounted in a shaper machine may stroke a planar surface in straight line motion for burnishing without any undue problems. The same tool mounted in a lathe machine effectively burnishes a rotating cylinder or column, with what may also be described as a straight line motion, without any undue problems. However, when burnishing is desired for surfaces which are not geometric as those described above, or where such surfaces have angled or other interrupted sections, the reciprocating or straight line motion of a shaper or the rotating motion of a lathe do not provide the type of motion necessary for the burnishing tool to follow these irregular surfaces.

It has been the practice, where additional hardening or stress conditioning of curved surfaces is required, to employ the shot peening method of hardening. In this method, the curved object is subjected to a stream or blast of a plurality of small metal balls which strike the surface randomly and provide a form of cold working.

This method requires equipment not ordinarily found in most metal working operations, and additionally requires specially trained personnel for its efficient operation. It should be considered also that shot peening does not provide a surface as smooth as a burnished one, nor one which is continuously and evenly worked in compression over the entire area exposed.

Accordingly, it is an object of this invention to provide an improved burnishing tool.

It is another object of this invention to provide a burnishing tool for burnishing curved or otherwise irregular surfaces.

It is a further object of this invention to provide a surface compensating arrangement for burnishing tools.

Figure 2:
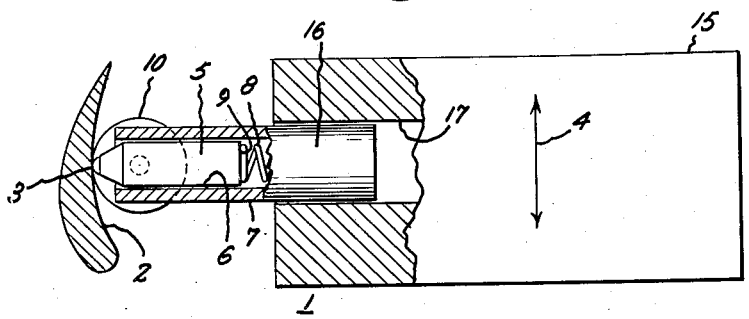

These and other objects and features of this invention will be better understood when taken in connection with the following description and the drawing, in which:

Fig. 1 shows a cross-sectional view of a burnishing tool incorporating the novel features of this invention; and Fig. 2 discloses schematically the burnishing tool moving in a reciprocal motion while permitting the burnishing element to follow a curved surface.

Fig. 1 illustrates a burnishing tool 1 arranged in working position adjacent a curved metal surface 2 such as a blade portion of a turbine bucket. The particular element utilized in this burnishing tool is illustrated as a diamond 3. It has been found that a small curved diamond or preferably a diamond having a spherical surface for engagement with the surface to be burnished provides, with a minimum of time and expense, a surface superior to the surface burnished with metal or other non-metallic burnishing elements other, or softer, than diamond. The burnishing tool 1 is arranged for mounting in a lathe or shaper machine to follow and burnish a curved surface. Fig. 1 shows the tool adjacent a curved blade surface 2 while in Fig. 2 there is schematically illustrated the tool 1 as mounted in a shaper, for reciprocal or straight line motion, as illustrated by arrows 4, while at the same time permitting the diamond to follow the curve of the blade 2 with a reciprocal motion of its own.

Referring again to Fig. 1, the fixed diamond 3 is mounted or otherwise affixed to a support 5 which is slidably positioned within a recess 6 of a frame member 7. In order to provide the proper force to press the diamond element into the surface 2, a spring 8 is positioned in the recess to bear against the frame 7 and the face 9 of support 5, thus biasing support 5 and the included diamond 3 against surface 2. Other suitable biasing means, adjustable or otherwise, including pneumatic and hydraulic devices, may be employed to adapt the tool for various burnishing qualities or for burnishing different metal or non-metallic materials.

The spring 8 provides the correct applied force for the tool in moving over a planar surface. Where irregularities or curved surfaces are encountered, the diamond must be adapted to reciprocate, to follow the curve or irregularity without substantially varying the applied force on the diamond element 3. To provide this automatic adjustability or self-compensating arrangement, the frame member 7 carries one or more closely spaced rolling elements or guides 10 engaging the surface 2. As illustrated, frame member 7 includes a pair of recesses 11 on opposite sides of the diamond 3 with a roller 10 rotatably mounted in each recess. At the rear face 12 of frame member 7, or the face opposite the one on which diamond 3 is mounted, there projects one or more arms 13 which slidably engage corresponding recesses 14 in a shank or holder 15. A preferred arrangement illustrated in Fig. 1 shows a pair of arms 13 projecting axially from frame 7 and into recesses 14 of shank 15. Where spring 8 or other biasing means of considerable length is employed, the recess 6 may be extended by being formed by a central projecting arm 16 which slidably engages a corresponding central recess 17 in shank 15. Frame member 7 is also biased outwardly from the shank 15 toward surface 2 by means of springs 18 positioned within recesses 14 and adapted to bear against the end walls 19 of recesses 14 and the end faces 20 of arms 13. Other biasing means, as described for springs 8, may also be employed in lieu of springs 18. Various devices well known in the art may be utilized to maintain the various parts in the arrangement as shown. One example of such a device includes a set screw and groove arrangement associated with both support 5 and an arm 13. In Fig. 1, arm 13 includes a groove 21 therein positioned to receive part of a set screw 22. The frame member 7 is thus prevented from being separated from shank 15. Support 5 also includes a groove 23 adapted to receive part of a set screw 24 and in a similar manner support 5 is prevented from separating from frame 7.

This invention thus provides a burnishing tool containing a diamond burnishing element which is caused to move across a surface for burnishing while having a substantially predetermined and maintained force applied thereon. As the tool moves in a straight line, reciprocating motion and approaches a rising or descending surface, the frame member 7 which carries the diamond element is adapted to rise or descend correspondingly with the diamond element. It is seen that this invention illustrates a form of burnishing tool capable of burnishing curved or irregular surfaces while maintaining at all points on the surface a substantially predetermined force engaging the diamond with the surface. It is to be understood that the work to be burnished may move while the tool is maintained stationary.

While other modifications of this invention and variations of apparatus which may be employed within the scope of the invention have not been described, the invention is intended to include all such as may be embraced within the following claims.

What we claim as new and desire to secure by Letters Patent of the United States is:

1. A tool adapted to burnish curved or otherwise irregular surfaces comprising in combination, a shank member having a recess therein, biasing means in said recess, a frame member having an arm projecting therefrom and slidably engaged in said shank recess for biasing the frame member outwardly therefrom, a rolling element on said frame member, a recess in said frame member, a support in said recess, a spherical surface diamond burnishing element fixedly mounted on said support, and means for biasing said spherical surface of said diamond burnishing element from said frame and against a surface to be burnished, said biasing means cooperating to provide a substantially constant force on said diamond upon a straight line motion of the tool over an irregular surface.

2. A tool adapted to burnish curved or otherwise irregular surfaces comprising in combination, a shank member having a pair of recesses therein, biasing means in said recesses, a frame member having a pair of arms projecting therefrom and slidably engaging said shank recesses for biasing the frame member outwardly therefrom, a pair of closely spaced rolling elements on said frame member to engage a surface to be burnished, said frame member having a recess therein between said rolling elements, a support in said recess, a spherical surface diamond burnishing element outwardly from said frame and fixedly mounted on said support, and means biasing said spherical surface diamond burnishing element against a surface to be burnished, said biasing means cooperating to provide a substantially constant force on said diamond upon a straight line motion of the tool over a sloping surface.

References Cited in the file of this patent

UNITED STATES PATENTS

| 341,524 | Way | May 11, 1886 |
|---|---|---|
| 917,149 | Reetz | Apr. 6, 1909 |
| 1,703,026 | Brosse | Feb. 19, 1929 |
| 2,378,838 | Comstock | June 19, 1945 |
| 2,378,843 | Haberstump | June 19, 1945 |

FOREIGN PATENTS

| 138,680 | Great Britain | Feb. 19, 1920 |
|---|---|---|
| 676,295 | Great Britain | July 23, 1952 |